US010324543B2

(12) United States Patent
Geum et al.

(10) Patent No.: US 10,324,543 B2
(45) Date of Patent: Jun. 18, 2019

(54) ELECTRONIC DEVICE COMPRISING ROTARY UNIT AND DISPLAY METHOD ACCORDING TO ROTATION OF ROTARY UNIT THEREOF

(71) Applicant: Samsung Electronics Co., Ltd., Gyeonggi-do (KR)

(72) Inventors: Hyegyung Geum, Seoul (KR); Seunghwan Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 162 days.

(21) Appl. No.: 15/134,859

(22) Filed: Apr. 21, 2016

(65) Prior Publication Data

US 2016/0313809 A1 Oct. 27, 2016

(30) Foreign Application Priority Data

Apr. 24, 2015 (KR) .................. 10-2015-0058042

(51) Int. Cl.
*G06F 1/16* (2006.01)
*G06F 3/0362* (2013.01)
*G06F 3/0481* (2013.01)

(52) U.S. Cl.
CPC ............ *G06F 3/0362* (2013.01); *G06F 1/163* (2013.01); *G06F 3/0481* (2013.01)

(58) Field of Classification Search
None
See application file for complete search history.

(56) References Cited

U.S. PATENT DOCUMENTS

| | | | | |
|---|---|---|---|---|
| 6,525,997 B1 * | 2/2003 | Narayanaswami | .. | G04G 9/0082 368/223 |
| 6,556,222 B1 * | 4/2003 | Narayanaswami | .. | G04G 9/0064 368/295 |
| 7,081,905 B1 * | 7/2006 | Raghunath | ............... | G04G 5/00 345/684 |
| 8,001,488 B1 | 8/2011 | Lam | | |
| 9,823,828 B2 * | 11/2017 | Zambetti | ............... | G06F 3/0362 |
| 2002/0063678 A1 * | 5/2002 | Wong | .................... | G06F 1/1626 345/156 |
| 2002/0101457 A1 * | 8/2002 | Lang | ...................... | G06F 1/163 715/856 |
| 2003/0103032 A1 * | 6/2003 | Wong | .................... | G06F 1/1626 345/156 |
| 2007/0211042 A1 | 9/2007 | Kim et al. | | |
| 2007/0247976 A1 | 10/2007 | Capozzi et al. | | |
| 2013/0024794 A1 | 1/2013 | Ha et al. | | |
| 2013/0167074 A1 * | 6/2013 | Oonishi | ............... | G06F 3/0488 715/799 |

(Continued)

FOREIGN PATENT DOCUMENTS

CN 1330303 1/2002
CN 101035148 9/2007

(Continued)

OTHER PUBLICATIONS

European Search Report dated Aug. 29, 2016 issued in counterpart application No. 16166490.9-1959, 6 pages.

(Continued)

*Primary Examiner* — Asher D Kells

(74) *Attorney, Agent, or Firm* — The Farrell Law Firm, P.C.

(57) ABSTRACT

The present disclosure relates to an electronic device and a display method thereof that are configured to display at least one first object in a main view; and display at least one second object in a sub-view, different from the main view, in response to a rotation input.

16 Claims, 21 Drawing Sheets

(56) References Cited

U.S. PATENT DOCUMENTS

| | | | |
|---|---|---|---|
| 2016/0034133 A1* | 2/2016 | Wilson | G06F 3/0488 |
| | | | 715/772 |
| 2016/0034166 A1* | 2/2016 | Wilson | G06F 3/04842 |
| | | | 715/771 |
| 2016/0034167 A1* | 2/2016 | Wilson | G06F 3/04845 |
| | | | 715/771 |
| 2016/0170598 A1* | 6/2016 | Zambetti | G06F 3/0485 |
| | | | 715/784 |
| 2016/0170608 A1* | 6/2016 | Zambetti | G06F 3/04817 |
| | | | 715/810 |
| 2016/0202866 A1* | 7/2016 | Zambetti | G06F 3/0485 |
| | | | 715/835 |
| 2016/0209939 A1* | 7/2016 | Zambetti | G06F 3/0362 |
| 2016/0231883 A1* | 8/2016 | Zambetti | G06F 1/169 |

FOREIGN PATENT DOCUMENTS

| | | |
|---|---|---|
| CN | 102890605 | 1/2013 |
| EP | 1 832 969 | 9/2007 |
| EP | 2 549 367 | 1/2013 |
| WO | WO 2015/034965 | 3/2015 |

OTHER PUBLICATIONS

European Search Report dated Feb. 26, 2018 issued in counterpart application No. 16166490.9-1221, 7 pages.
Chinese Office Action dated Aug. 3, 2018 issued in counterpart application No. 201610261181.2, 16 pages.
EP Summons to Attend Oral Proceedings dated Apr. 26, 2019 issued in counterpart application No. 16166490.9-1221, 6 pages.

* cited by examiner

ELECTRONIC DEVICE COMPRISING ROTARY UNIT AND DISPLAY METHOD ACCORDING TO ROTATION OF ROTARY UNIT THEREOF

PRIORITY

This application claims priority under 35 U.S.C. § 119(a) to Korean Application Serial No. 10-2015-0058042, which was filed in the Korean Intellectual Property Office on Apr. 24, 2015, the entire content of which is incorporated herein by reference.

BACKGROUND

1. Field of the Disclosure

The present disclosure relates generally to an electronic device and an operating method thereof, and more specifically, to an electronic device including a display unit and a display method thereof.

2. Description of the Related Art

In general, electronic devices perform various functions, either alone or in combination. For example, electronic devices may perform mobile communication functions, data communication functions, image photographing functions, audio recording functions, etc.

Electronic devices also store and manage a large amount of data. Consequently, electronic devices may search for and display data, e.g., via the display units included in the electronic devices.

However, portable electronic devices, for example, often have limitations on the amount of data that can displayed on the display units thereof, e.g., due to relatively smaller screen sizes. As a result, users of these type of electronic devices often have difficulties in identifying correlations between the data. The potential for these types of problems increases as the display units therein are made smaller. As a result, the use efficiency and user convenience of the electronic devices may be degraded.

SUMMARY

The present disclosure is made to address at least the problems and/or disadvantages described above and to provide at least the advantages described below.

Accordingly, an aspect of the present disclosure is to provide an electronic device and a display method thereof, which display an object through various views. Another aspect of the present disclosure is to provide an electronic device and a display method thereof, wherein the electronic device performs switching between the views in response to a rotation input, in order for a user of the electronic device to easily identify a correlation between the data.

In accordance with an aspect of the present disclosure, a display method of an electronic device is provided, which includes displaying at least one first object in a main view; and displaying at least one second object in a sub-view, different from the main view, in response to a rotation input.

In accordance with another aspect of the present disclosure, an electronic device is provided, which includes a display unit; a rotary unit configured to generate a rotation input; and a controller configured to control the display unit to display at least one first object in a main view, and to control the display unit to display at least one second object in a sub-view that different from the main view, in response to the rotation input.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
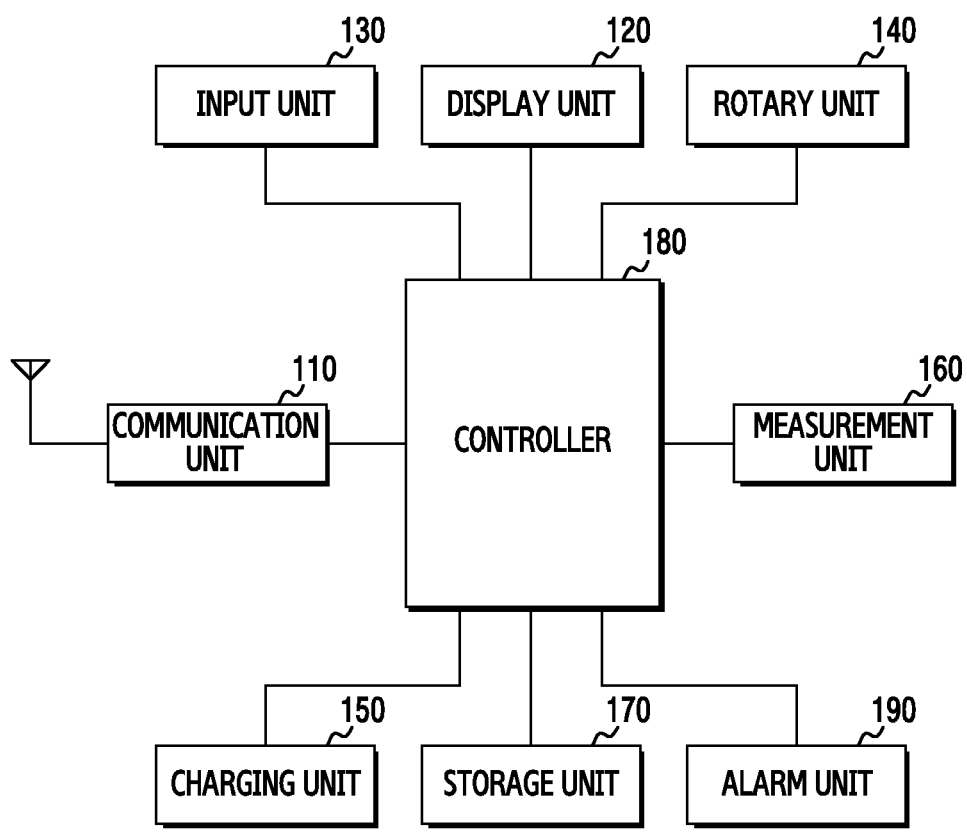
FIG. 1 illustrates an electronic device according to an embodiment of the present disclosure.

Hereinafter, various embodiments of the present disclosure will be described in more detail with reference to the accompanying drawings. Here, the same or similar reference numerals may denote the same or similar structural elements in the accompanying drawings. Detailed descriptions of known functions and structures will be omitted to avoid obscuring the subject matter of the present disclosure.

Herein, the term "view" represents a screen configuration scheme in an electronic device. For example, a view may be set in advance for each function, and the electronic device displays content to correspond to the view.

The term "object" represents an element of content that may be displayed in a view. For example, an object may include a background screen, an item, and/or an icon, and the structure, location, size, etc., of the object may be determined according to the view.

Figure 2:
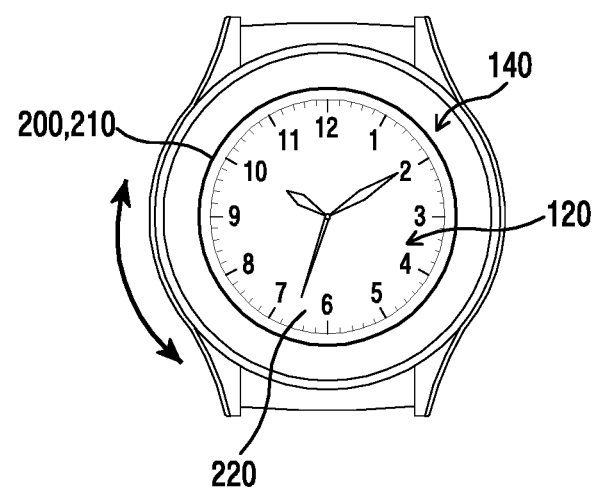
FIG. 2 illustrates an electronic device according to an embodiment of the present disclosure.

FIGS. 1 and 2 illustrate an electronic device according to an embodiment of the present disclosure. Although the following description illustrates the electronic device as a watch-type wearable device, the present disclosure is not limited thereto.

Referring to FIG. 1, the electronic device includes a communication unit 110, a display unit 120, an input unit 130, a rotary unit 140, a charging unit 150, a measurement unit 160, a storage unit 170, a controller 180, and an alarm unit 190. Other or fewer components may be present dependent on the type of the electronic device.

The communication unit 110 performs communication in the electronic device 100. For example, the communication unit 110 may communicate with an external device (e.g., another electronic device, a base station, a server, a satellite, etc.) using various communication schemes through wireless communication and/or wired communication. The communication schemes may include Long Term Evolution (LTE), Wideband Code Division Multiple Access (WCDMA), Global System for Mobile Communication (GSM), Wi-Fi, Bluetooth, and Near Field Communication (NFC).

The communication unit 110 may access at least one of a mobile communication network and a data communication network.

The display unit 120 displays display data in the electronic device 100. The display unit 120 may include a Liquid Crystal Display (LCD), a Light Emitting Diode (LED) display, an Organic LED (OLED) display, a Micro Electro Mechanical System (MEMS) display, and an electronic paper display. The display unit 120 may be implemented in various shapes. For example, the display unit 120 may be implemented in a circular shape, as illustrated in FIG. 2.

The input unit 130 generates input data in the electronic device 100, e.g., in response to a user input in the electronic device 100. The input unit 130 may include at least one input device, such as a key pad, a dome switch, a physical button, a touch panel, a jog & shuttle, a sensor, etc. The input unit 130 and the display unit 120 may be integrated as a touch screen.

The rotary unit 140 generates input data according to a rotation input in the electronic device 100. For example, the rotary unit 140 may generate the input data in response to a rotation input by a user of the electronic device 100. The rotary unit 140 is rotatably fastened around the display unit 120. In addition, the rotary unit 140 may generate pressure (squeeze) input data, e.g., in response to a squeeze user input.

The rotary unit 140 may be implemented in various shapes. For example, as illustrated in FIG. 2, the rotary unit 140 may be implemented in a circular ring shape that surrounds the display unit 120. The rotary unit 140 may rotate about the central axis of the display unit 120 in the clockwise or counterclockwise direction. Alternatively, the rotary unit 140 may be implemented in the shape of a circular cylinder.

For example, the rotary unit 140 may be implemented in a shape similar to the crown of an analog watch. Accordingly, at least a part of the rotary unit 140 may be inserted into the electronic device 100, and the rest of the rotary part 140 may protrude to the outside of the electronic device 100. Further, the rotary unit 140 may rotate about a vertical axis perpendicular to the central axis of the display unit 120 in the clockwise or counterclockwise direction.

The charging unit 150 supplies power in the electronic device 100. The charging unit 150 may be recharged by power received from an external power supply. The charging unit 150 may be connected to the external power supply in a wired or wireless manner to receive power. The charging unit 150 may convert and store power. Further, the charging unit 150 may supply power to the elements of the electronic device 100. For example, the charging unit 150 may be disposed at a back side of the display unit 120.

The measurement unit 160 collects measured data in the electronic device 100, e.g., from the surrounding environment of the electronic device 100. The measurement unit 160 may include various types of sensors.

The measured data may include activity data and biometric data. For example, the activity data may include at least one of inactivity, light walking (light active), and healthy pace exercise, and the biometric data may include at least one of blood sugar, heart rate, electrocardiogram, sweat, blood pressure, nutrition, sleep, respiratory rate, oxygen saturation, water intake, and caffeine intake.

The measurement unit 160 may collect the measured data in response to a change in the positioning of the electronic device 100. For example, the measurement unit 160 may detect a change in the positioning of the display unit 120 using an acceleration sensor, a geomagnetism sensor, and a gyroscope sensor.

The storage unit 170 stores operating programs of the electronic device 100, e.g., a plurality of functions (or applications). For example, the functions may include an image management function, a health care function, a message reception function, a call reception function, etc. The storage unit 170 may store a program for displaying at least one object according to a rotation input.

Further, the storage unit 170 stores data that is generated while programs are executed. For example, the storage unit 170 may store the data based on various types of events.

The storage unit 170 may store notification data in response to a notification event, e.g., a communication event, such as a message, a call, etc., or a scheduling event, such as a morning call, an alarm, a schedule, etc.

In addition, the storage unit 170 may store input data in response to an input event.

The controller 180 controls an overall operation of the electronic device 100. The controller 180 may perform a plurality of functions. Accordingly, the controller 180 may include a function processor, e.g., an Application Processor (AP), for individual functions. The function processor may substantially process the individual functions. Examples of the functions may include an image management function, a health care function, a message reception function, a call reception function, etc.

The controller 180 may control the display unit 120 to display at least one object 220, as illustrated in FIG. 2. Accordingly, the controller 180 may form a view 200 to correspond to the display unit 120. Further, the controller 180 may change the view 200 in response to a rotation input of the rotary unit 140. The view 200 may include at least one display area 210 for the object 220. For example, the display area 210 may correspond to the entire area of the view 200, or may correspond to a partial area of the view 200. That is, the size of the display area 210 may be the same as, or smaller than, that of the view 200. In the example illustrated in FIG. 2, the view 200 and the display area 210 both have a circular shape.

In addition, the controller 180 may display the object 220 in the view 200. Here, the controller 180 may display the object 220 in the display area 210 of the view 200. For example, the controller 180 may process the object 220 to correspond to the size of the display area 210. As a result, the size of the object 220 may be the same size as the display area 210.

The alarm unit 190 generates an alarm signal in the electronic device 100. For example, the alarm signal may include at least one of a light-emitting signal, an audio signal, and a vibration signal.

Figure 3:
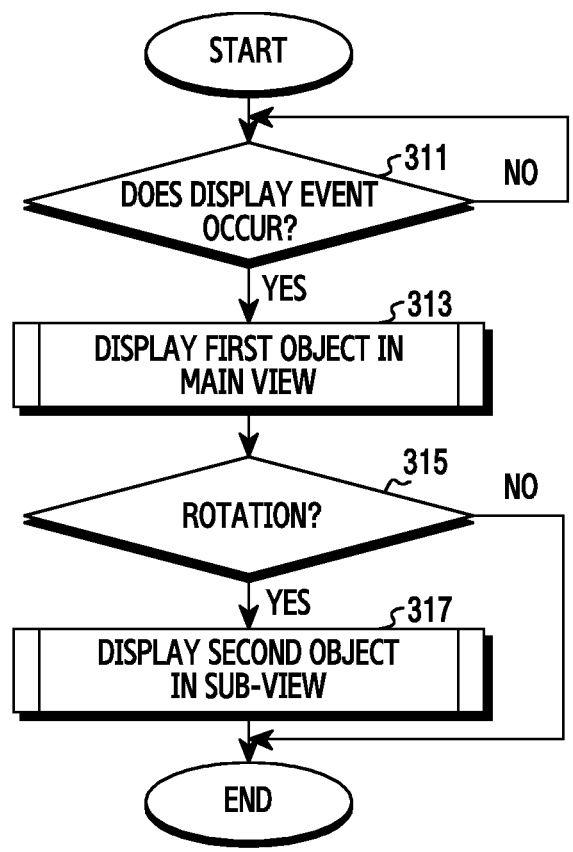
FIG. 3 is a flowchart illustrating a display method in an electronic device according to an embodiment of the present disclosure.

FIG. 3 is a flowchart illustrating a display method according to an embodiment of the present disclosure. For example, the method illustrated in FIG. 3 will be described as being performed by the electronic device illustrated in FIG. 1.

Referring to FIG. 3, in step 311, the controller 180 detects a display event. The display event may occur when a change in the positioning of the electronic device is detected. For example, the measurement unit 160 may detect a change in the positioning of the electronic device 100 when a user moved the electronic device to view the display unit 120.

The display event may also occur when data is received from an external device, when a user input of the electronic device 100 is generated, or when one of the applications is executed in the electronic device 100. Conditions for generating a display event may have be preset in the storage unit 170.

In step 313, the controller 180 controls the display unit 120 to display a first object in a main view. The controller 180 may form the main view to correspond to the display unit 120. The main view includes a first display area, which may correspond to a portion of or an entire area of the main view. The controller 180 displays the first object in the main view. Accordingly, the controller 180 may process data for the first object to correspond to the first display area. As described above, the first object may include a background screen, an item, and/or an icon.

When a rotation input generated through the rotary unit 140 is detected by the controller 180 in step 315, the controller 180 displays a second object in a sub-view in step 317. The controller 180 may form the sub-view to correspond to the display unit 120. The sub-view includes a second display area, which may correspond to a partial area of or an entire area of the sub-view. The controller 180 displays the second object in the sub-view. Accordingly, the controller 180 may process data for the second object to correspond to the second display area. The second object may be an icon or an item. The data for the second object may be the same as that of the first object or may differ from that of the first object.

Figure 4:
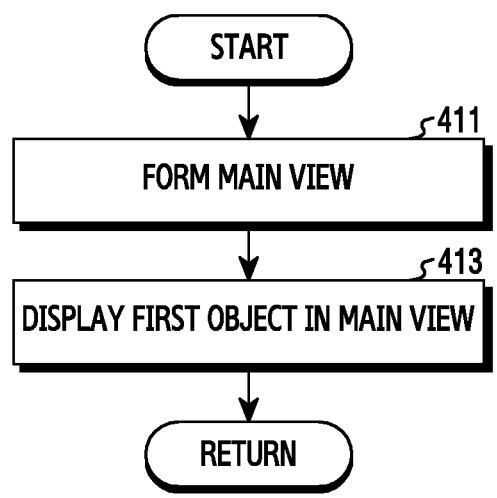
FIG. 4 is a flowchart illustrating a method of displaying an object in a main view according to an embodiment of the present disclosure.

FIG. 4 is a flowchart illustrating a method of displaying an object in a main view according to an embodiment of the present disclosure. For example, the method illustrated in FIG. 4 will be described as being performed by the electronic device illustrated in FIG. 1. The method illustrated in FIG. 4 may be performed in step 313 of FIG. 3.

Figure 6:
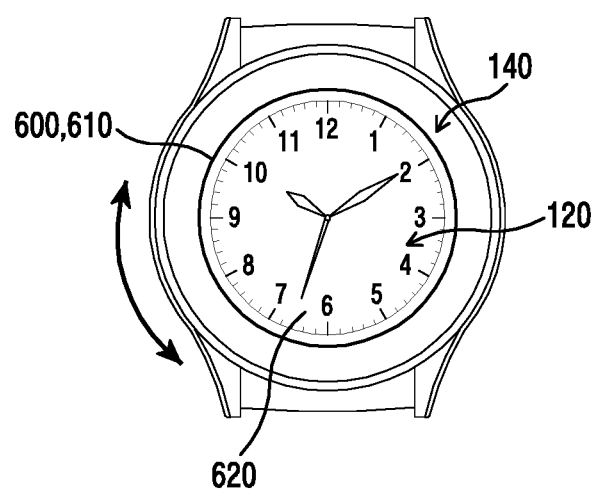
FIG. 6 illustrates an example of displaying an object in a main view according to an embodiment of the present disclosure.
Figure 16:
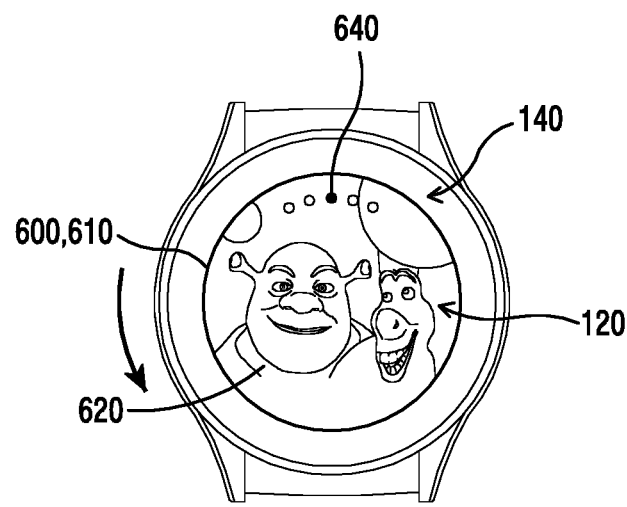
FIG. 16 illustrates an example of displaying an object in a main view according to an embodiment of the present disclosure.

Referring to FIG. 4, the controller 180 forms a main view in operation 411. FIGS. 6 and 16 each illustrates an example of displaying an object in a main view according to an embodiment of the present disclosure.

Referring to FIG. 6, the controller 180 forms a main view 600 to correspond to the display unit 120. The shape of the main view 600 is the same as that of the display unit 120, i.e., circular. Further, the size of the main view 600 is the same as that of the display unit 120.

The main view 600 includes a first display area 610, which may correspond to the entire area of the main view 600. Accordingly, the shape and the size of the first display area 610 are the same as those of the main view 600.

Referring again to FIG. 4, in step 413, the controller 180 displays a first object in the main view.

Referring again to FIG. 6, the controller 180 displays a first object 620 in the first display area 610 of the main view 600. Here, the shape and the size of the first object 620 is the same as those of the first display area 610.

Accordingly, the controller 180 may process data for the first object 620. For example, the controller 180 may decode the data for the first object 620 to correspond to the first display area 610.

In the example of FIG. 6, the first object 620 is a background screen in the main view 600. Alternatively, the first object 620 may be an item.

The controller 180 may display one of a plurality of first objects 620 in the main view 600. For example, referring to FIG. 16, the controller 180 may display an item and may additionally display an indicator 640 in the main view 600. Here, the controller 180 may display the indicator 640 in the first display area 610. For example, the indicator 640 indicates the presence of four other first objects 620, using the circles that are not filled in. The indicator 640 may also be implemented in various shapes.

Figure 5:
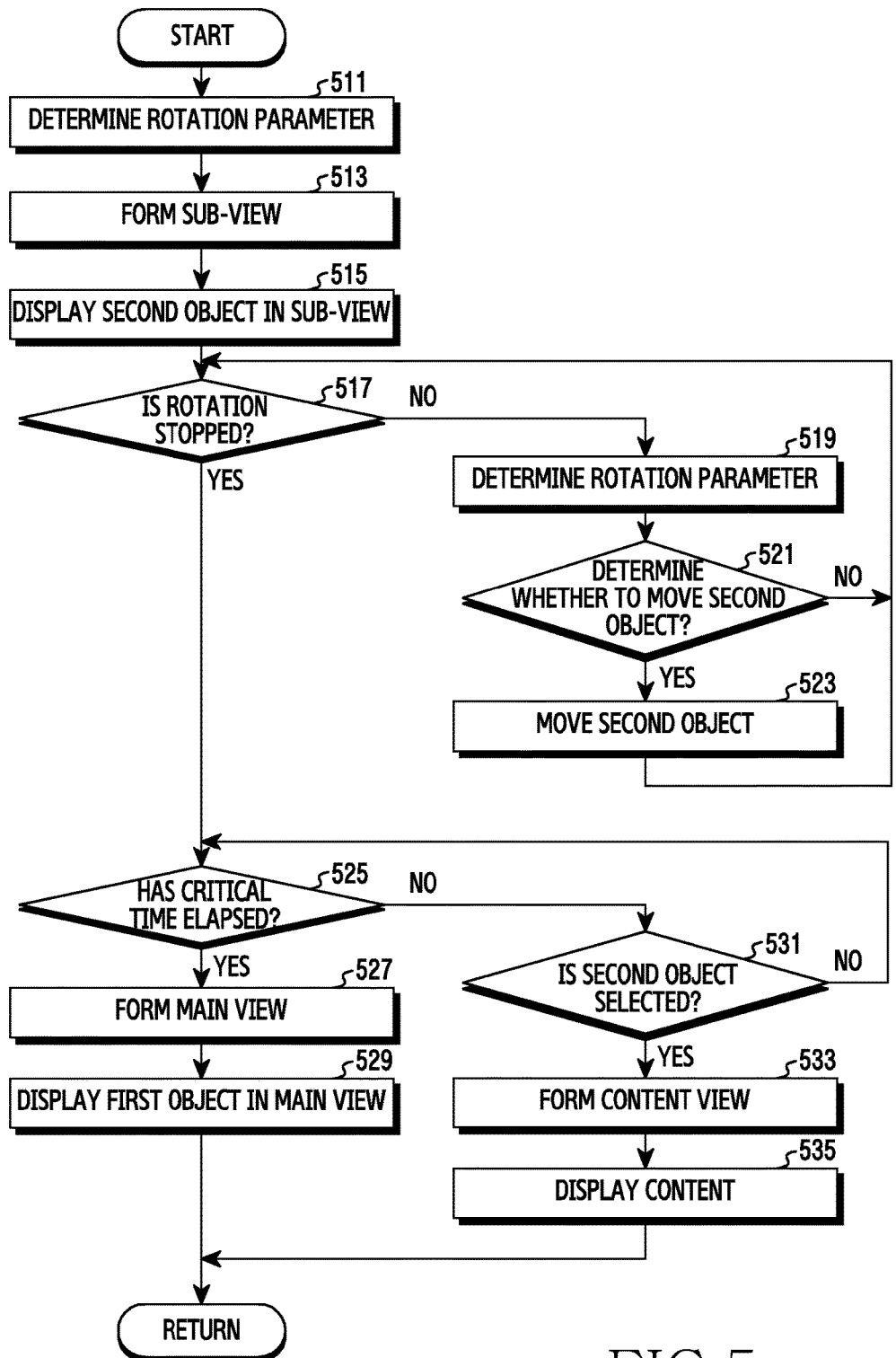
FIG. 5 is a flowchart illustrating a method of displaying an object in a sub-view according to an embodiment of the present disclosure.

FIG. 5 is a flowchart illustrating a method of displaying an object in a sub-view according to an embodiment of the present disclosure. For example, the method illustrated in FIG. 5 will be described as being performed by the electronic device illustrated in FIG. 1. The method illustrated in FIG. 5 may be performed in step 317 of FIG. 3.

Referring to FIG. 5, in step 511, the controller 180 determines a rotation parameter from a rotation input of the rotary unit 140. For example, the rotation parameter may include the direction, angle, and time of rotation.

In step 513, the controller 180 forms a sub-view.

Figure 7:
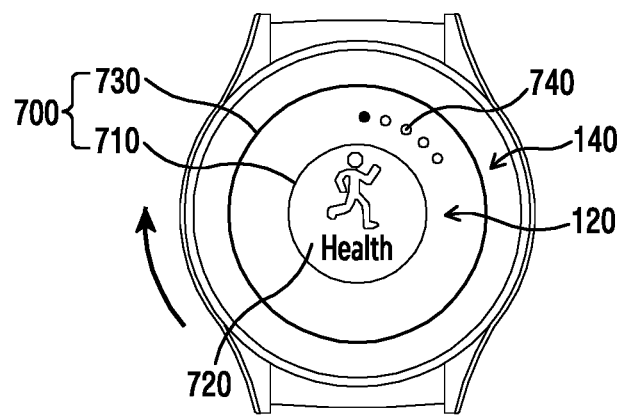
FIGS. 7 and 8 illustrate different examples of displaying an object in a sub-view according to various embodiments of the present disclosure.
Figure 8:
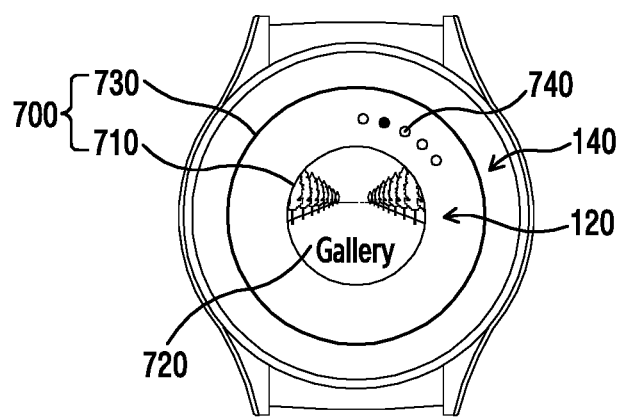

FIGS. 7 and 8 illustrate different examples of displaying an object in a sub-view according to various embodiments of the present disclosure.

Referring to FIG. 7, the controller 180 forms a sub-view 700 corresponding to the display unit 120. In FIG. 7, the shape and the size of the sub-view 700 are the same as those of the display unit 120. Accordingly, the size of the sub-view 700 may also be the same as that of the main view 600.

The sub-view 700 includes a second display area 710, which corresponds to a partial area of the sub-view 700, and an outer peripheral area 730.

In the example illustrated in FIG. 7, the sub-view 700 includes the second display area 710, which is disposed in a central area of the sub-view 700. Specifically, the shape of the second display area 710 is the same as that of the sub-view 700, but the size of the second display area 710 is smaller than that of the sub-view 700. The outer peripheral area 730 is disposed around the second display area 710 in the sub-view 700.

Referring again to FIG. 5, in step 515, the controller 180 displays a second object in the sub-view. For example, the controller 180 may determine one of a plurality of second objects according to a direction of rotation.

Referring again to FIG. 7, the controller 180 displays the second object 720 in the second display area 710 of the sub-view 700. The shape and the size of the second object 720 are the same as those of the second display area 710.

Accordingly, the controller 180 may process data for the second object 720. The data for the second object 720 may differ from that for the first object 620. For example, the controller 180 may decode the data for the second object 720 to correspond to the second display area 710.

The controller 180 may determine whether to display the second object 720 according to the angle of rotation. To this end, the controller 180 may compare the angle of rotation and a unit angle. The unit angle may be determined by dividing the rotatable angle of the rotary unit 140 into a predetermined number of angles. Namely, the controller 180 may determine whether the angle of rotation reaches the unit angle. The unit angle may be set in advance in the storage unit 170. When it is determined that the angle of rotation reaches the unit angle, the controller 180 may determine to display the second object 720. When it is determined that the second object 720 is to be displayed, the controller 180 may display the second object 720.

In this case, the second object 720 may include at least one of an icon and an item. For example, as illustrated in FIG. 7, the controller 180 may display an icon or an item in the sub-view 700, in response to a rotation input while displaying a background screen in the main view 600 as illustrated in FIG. 6.

The second object 720 may be an icon having a function allocated thereto. For example, when the direction of rotation is clockwise, the controller 180 may display one of the icons, as illustrated in FIG. 7.

Figure 11:
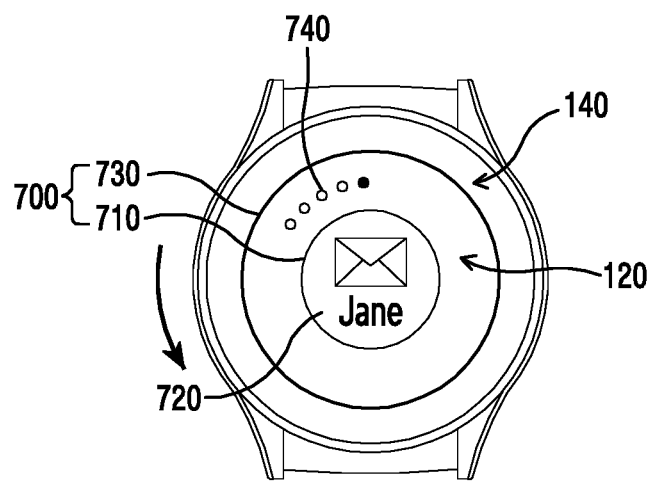
FIGS. 11 and 12 illustrate different examples of displaying an object in a sub-view according to various embodiments of the present disclosure.

Alternatively, the second object 720 may be an item corresponding to a notification event. For example, when the direction of rotation is counterclockwise, the controller 180 may display one of the items, as illustrated in FIG. 11

The controller 180 may additionally display an indicator 740 in the outer peripheral area 730 of the sub-view 700. For example, in FIG. 7, the indicator 740 indicates the presence of four other second objects 720 using the non-filled circles. The indicator 740 may be implemented in various shapes.

Referring again to FIG. 5, the controller 180 determines if the rotation input has stopped in step 517.

When the stoppage of the rotation input is not detected in step 517, the controller 180 determines a rotation parameter in step 519. For example, the controller 180 continually determines the rotation parameter from the rotation input of the rotary unit 140 and may continually update the rotation parameter according to the rotation input.

In step 521, the controller 180 determines whether to move the second object 720. Namely, the controller 180 determines whether to change the second object 720 in the sub-view 700, e.g., according to the angle of rotation. To this end, the controller 180 may compare the angle of rotation and a unit angle. The controller 180 may determine whether the angle of rotation reaches at least one unit angle. Whenever the angle of rotation increases and reaches each unit angle, the controller 180 may determine to move the second object 720, i.e., to change the second object being displayed.

When it is determined that the second object 720 is not to be moved in step 521, the method returns to step 517. However, when it is determined that the second object 720 is to be moved in step 521, the controller 180 moves the second object 720 in step 523. Namely, the controller 180 changes the second object 720 being displayed in the sub-view 700, and the method returns to step 517.

For example, while displaying one of the icons in the sub-view 700, as illustrated in FIG. 7, the controller 180 may display another icon in the sub-view 700 in response to the rotation input. When the direction of rotation is clockwise, the controller 180 may display another icon, as illustrated in FIG. 8.

Figure 12:
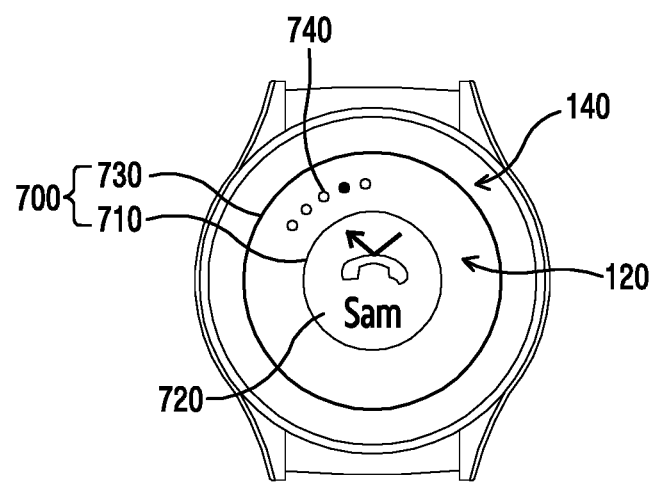

As another example, while displaying one of the items in the sub-view 700 as illustrated in FIG. 11, the controller 180 may display another item in the sub-view 700 in response to the rotation input. When the direction of rotation is counterclockwise, the controller 180 may display another item, as illustrated in FIG. 12.

The controller 180 may continually display the indicator 740 in the sub-view 700.

Referring again to FIG. 5, when the controller 180 detects the stoppage of the rotation input in step 517, the controller 180 determines if a critical time has elapsed in step 525. After the rotation stops, when no input data is generated from the input unit 130 or the rotary unit 140 and the critical time has elapsed, the controller 180 may determine that the critical time has elapsed. The critical time may be set in advance in the storage unit 170.

In step 527, the controller 180 forms a main view, and in step 529, the controller 180 displays a first object in the main view. Accordingly, the controller 180 may process data for the first object 620. For example, the controller 180 forms the main view 600 and displays the first object 620 therein, as illustrated in FIG. 6.

Figure 9:
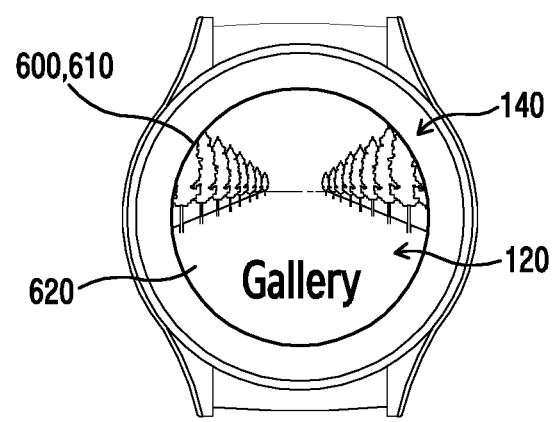
FIG. 9 illustrates an example of displaying an object in a main view according to an embodiment of the present disclosure.

For example, when a critical time has elapsed while an icon 720 is being displayed in the sub-view 700, as illustrated in FIG. 8, the controller 180 may display the corresponding icon 720 in the main view 600, as illustrated in FIG. 9. The controller 180 may decode data for the corresponding icon to correspond to the first display area 610 of the main view 600.

Figure 13:
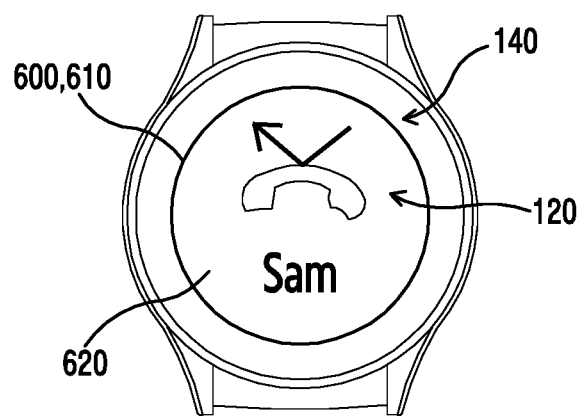
FIG. 13 illustrates an example of displaying an object in a main view according to an embodiment of the present disclosure.

As another example, when a critical time has elapsed while an item 720 is being displayed in the sub-view 700, as illustrated in FIG. 12, the controller 180 may display the corresponding item 720 in the main view 600, as illustrated in FIG. 13. The controller 180 may decode data for the corresponding item to correspond to the first display area 610 of the main view 600.

Referring again to FIG. 5, when the controller 180 determines that the critical time has not elapsed in step 525, the controller 180 determines if the second object is selected in step 531.

For example, referring to FIG. 7, when a touch is generated in the second display area 710, the controller 180 may detect the selection of the second object 720. Alternatively, when a pressure input data is generated by the rotary unit 140, the controller 180 may detect the selection of the second object 720.

Referring again to FIG. 5, in step 533, the controller 180 forms a content view corresponding to the display unit 120. The shape and the size of the content view may be the same as those of the display unit 120.

In step 535, the controller 180 displays content in the content view.

Figure 10:
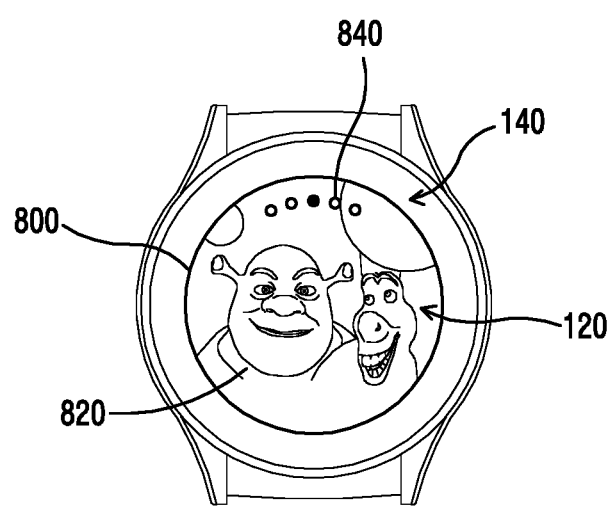
FIG. 10 illustrates an example of displaying content in a content view according to an embodiment of the present disclosure.
Figure 17:
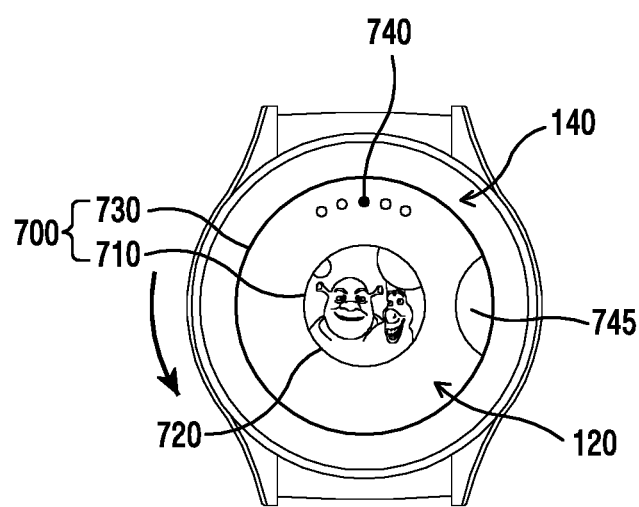
FIGS. 17 to 20 illustrate different examples of displaying an object in a sub-view according to various embodiments of the present disclosure.

For example, while an icon 720 is being displayed in the sub-view 700, as illustrated in FIG. 17, if the corresponding icon 720 is selected, the controller 180 may display the content of the corresponding icon 720. Namely, the controller 180 may display the content 820 in the content view 800, as illustrated in FIG. 10. Accordingly, the controller 180 may execute the function allocated to the corresponding icon.

Figure 14:
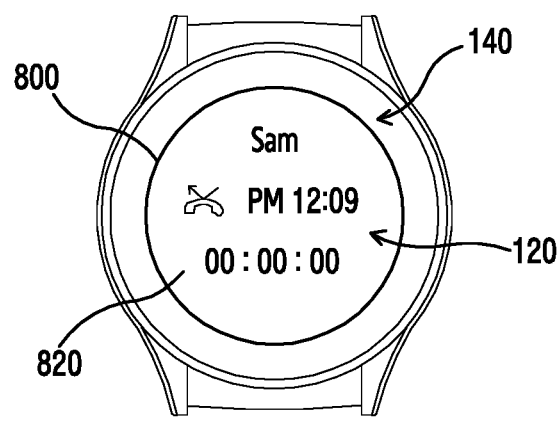
FIG. 14 illustrates an example of displaying content in a content view according to an embodiment of the present disclosure.

As another example, while an item 720 is being displayed in the sub-view 700, as illustrated in FIG. 12, if the corresponding item 720 is selected, the controller 180 may display the content 820 in the content view 800, as illustrated in FIG. 14. Specifically, the controller 180 may execute the function, i.e., a call function to Sam, corresponding to the relevant item 720.

Figure 15:
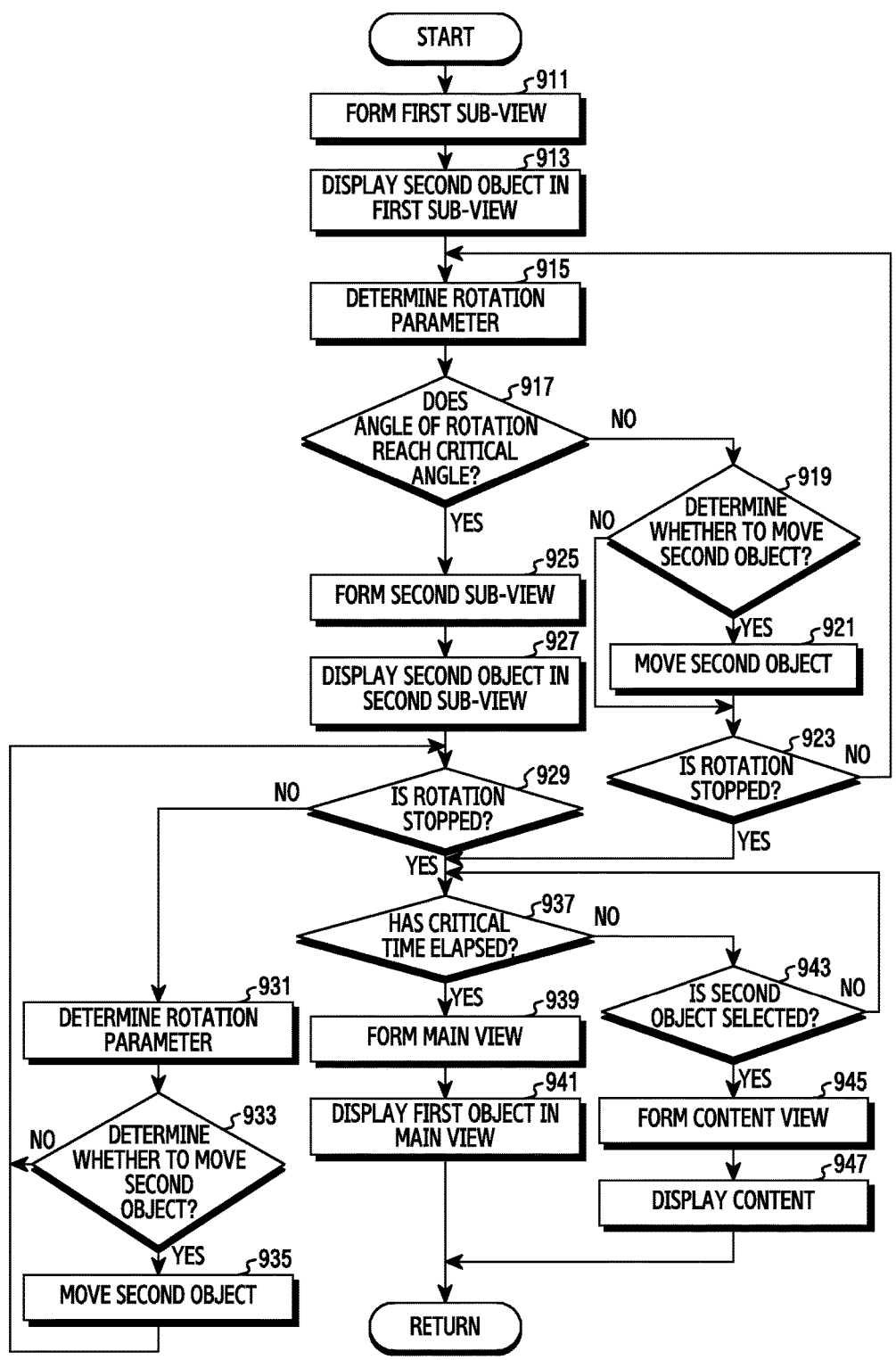
FIG. 15 is a flowchart illustrating a method of displaying an object in a sub-view according to an embodiment of the present disclosure.

FIG. 15 is a flowchart illustrating a method of displaying an object in a sub-view according to an embodiment of the present disclosure. For example, the method illustrated in FIG. 15 will be described as being performed by the electronic device illustrated in FIG. 1. The method illustrated in FIG. 15 may be performed in step 317 of FIG. 3.

Referring to FIG. 15, in step 911, the controller 180 forms a first sub-view. As described above, the controller 180 may form the first sub-view to correspond to the display unit 120, and the shape and the size of the first sub-view may be the same as those of the display unit 120.

FIG. 17 illustrates an example of displaying an object in a sub-view according to an embodiment of the present disclosure.

Referring to FIG. 17, a first sub-view 700 includes a second display area 710 and a first outer peripheral area 730. The second display area 710 corresponds to a partial area of the first sub-view 700. Specifically, the second display area 710 is disposed in a central area of the first sub-view 700. The shape of the second display area 710 is the same as that of the first sub-view 700, but the size of the second display area 710 is smaller than that of the first sub-view 700. Further, the size of the second display area 710 is smaller than that of a first display area 610 of a main view 600, as illustrated in FIG. 16.

The first outer peripheral area 730 surrounds the second display area 710 in the first sub-view 700.

Referring again to FIG. 15, in step 913, the controller 180 displays a second object in the first sub-view.

Referring again to FIG. 17, the controller 180 displays the second object 720 in the second display area 710 of the first sub-view 700. Here, the shape and the size of the second object 720 are the same as those of the second display area 710. Accordingly, the controller 180 may process data for the second object 720. The data for the second object 720 may be the same as that for the first object 620, as illustrated in FIG. 16. For example, the controller 180 may decode the data for the second object 720 to correspond to the second display area 710.

The controller 180 may display one of a plurality of second objects 720.

For example, while displaying one of the items 620 in the main view 600, as illustrated in FIG. 16, in response to a rotation input, the controller 180 may then display the corresponding item 720 in the first sub-view 700, as illustrated in FIG. 17.

Further, the controller 180 may also display an indicator 740 in the first outer peripheral area 730 of the first sub-view 700. For example, the indicator 740 indicates the presence of four other second objects 720 using the circles. The indicator 740 may be implemented in various shapes.

The controller 180 may additionally display a cue 745 in the first outer peripheral area 730 of the first sub-view 700. For example, the cue 745 represents the presence of the other second objects 720. Namely, based on the second object 720, the cue 745 may guide a user to the locations of the remaining second objects 720. The cue 745 may be implemented in various shapes.

Referring again to FIG. 15, the controller 180 determines a rotation parameter from a rotation input of the rotary unit 140 in step 915. For example, the rotation parameter may include the direction, angle, and time of rotation.

In step 917, the controller 180 determines whether the angle of rotation reaches a critical angle. The controller 180 may compare the angle of rotation and the critical angle. The critical angle may be constituted by one or more unit angles, which may be determined by dividing the rotatable angle of the rotary unit 140 into a predetermined number of angles. Further, the critical angle may be set in advance in the storage unit 170.

When the controller 180 determines that the angle of rotation does not reach the critical angle in step 917, the controller 180 determines whether to move the second object 720 in step 919. As described above, the controller 180 determines whether to change the second object 720 in the first sub-view 700, e.g., according to the angle of rotation. Whenever the angle of rotation increases and reaches each unit angle, the controller 180 may determine to move the second object 720.

When the controller 180 determines to move the second object 720 in step 919, the controller 180 moves the second object 720 in step 921. Namely, the controller 180 changes the second object 720 that is displayed in the first sub-view 700.

Figure 18:
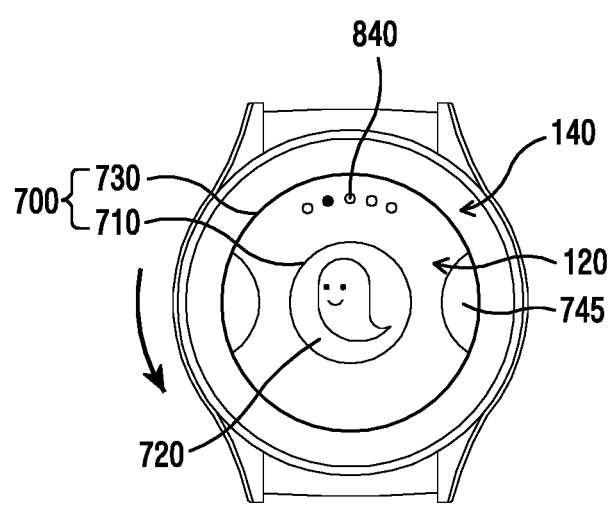

For example, while displaying one of the items 720 in the first sub-view 700, as illustrated in FIG. 17, in response to the rotation input, the controller 180 may display another item 720 in the first sub-view 700, as illustrated in FIG. 18. The controller 180 may continually display the indicator 740 in the first sub-view 700. The controller 180 may additionally display the cue 745 in the first sub-view 700. As illustrated in FIG. 18, the cue 745 also includes an item edge on the left of the first sub-view 700, which indicates the location of the previous item that was displayed before the rotation input was received.

Referring again to FIG. 15, when the controller 180 determines that the second object 720 is not to be moved, the controller 180 determines if the rotation input has stopped in step 923.

When the controller 180 determines that the angle of rotation has reached the critical angle in step 917, the controller 180 forms a second sub-view in step 925. Specifically, the controller 180 changes the first sub-view 700 into a second sub-view 750, as illustrated in FIG. 19.

The controller 180 may form the second sub-view to correspond to the display unit 120. The shape and the size of the second sub-view may be the same as those of the display unit 120.

Figure 19:
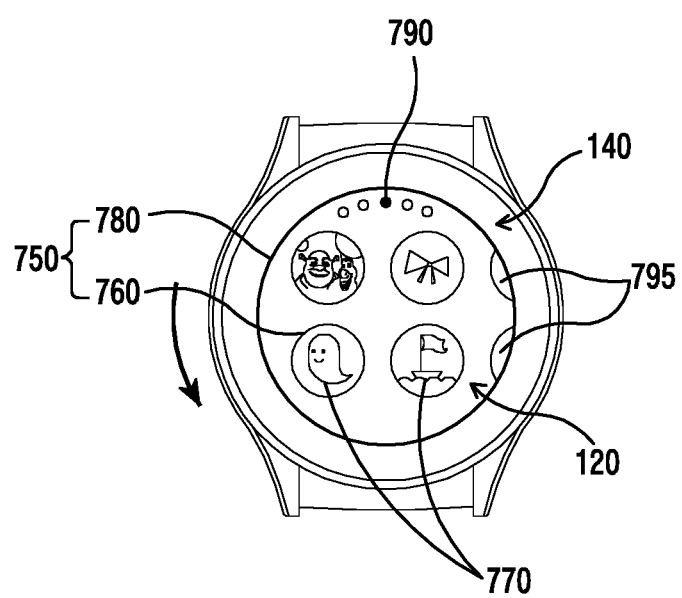

Referring to FIG. 19, the second sub-view 750 includes a plurality of second display areas 760 and a second outer peripheral area 780. Here, where the first sub-view 700 includes a plurality of second display areas 710, the number of second display areas 760 in the second sub-view 750 may exceed the number of second display areas 710 in the first sub-view 700. Further, the second display areas 760 may correspond to partial areas of the second sub-view 750. For example, the second display areas 760 may be disposed to be spaced apart from each other in the second sub-view 750. Specifically, the shapes of the second display areas 760 may be the same as that of the second sub-view 750. For example, the second display areas 760 may have a circular shape. The shapes of the second display areas 760 may be the same as that of the first display area 610. Further, the sizes of the second display areas 760 are smaller than that of the second sub-view 750. The second outer peripheral area 780 may be disposed around the second display areas 760 in the second sub-view 750.

Referring again to FIG. 15, in step 927, the controller 180 displays second objects in the second sub-view. In this case, the controller 180 may determine at least two of the plurality of second objects according to a direction of rotation. Here, the controller 180 may decode the data for the second objects to correspond to the second display areas.

For example, while one of the items 720 is being displayed in the first sub-view 700, as illustrated in FIG. 18, when the angle of rotation reaches the critical angle, the controller 180 may display at least two of the items in the second sub-view 750, as illustrated in FIG. 19. Here, the controller 180 may display one of the items and at least one other item. The controller 180 may display one of the items in one of the second display areas 760, which is situated at a predetermined location.

The controller 180 may additionally display an indicator 790 in the second outer peripheral area 780 of the second sub-view 750. For example, the indicator 790 indicates the presence of other second objects 770. The indicator 790 may be implemented in various shapes.

The controller 180 may additionally display a cue 795 in the second outer peripheral area 780 of the second sub-view 750. For example, the cue 795 may represent the presence of the other second objects 770. Namely, based on the second object 770, the cue 795 may guide the user to the locations of the other second objects 770. The cue 795 may also be implemented in various shapes.

Referring again to FIG. 15, the controller 180 determines if the rotation input stops in step 929. When the stoppage of the rotation input is not detected by the controller 180 in step 929, the controller 180 determines a rotation parameter in step 931. For example, the controller 180 continually determines the rotation parameter from the rotation input of the rotary unit 140, and may continually update the rotation parameter according to the rotation input.

In step 933, the controller 180 determines whether to move the second objects 770, i.e., whether to change the second objects 770 in the second sub-view 750. In this case, the controller 180 may determine whether to move the second objects 770 according to the angle of rotation. Whenever the angle of rotation increases and reaches each unit angle, the controller 180 may determine to move the second objects 770.

When the controller 180 determines that the second objects 770 are not to be moved in step 933, the method returns to step 929.

However, when the controller 180 determines that the second objects 770 are to be moved, the controller 180 moves the second objects 770 in step 935. Namely, the controller 180 changes the second objects 770 in the second sub-view 750. Thereafter, the method returns to step 929.

Figure 20:
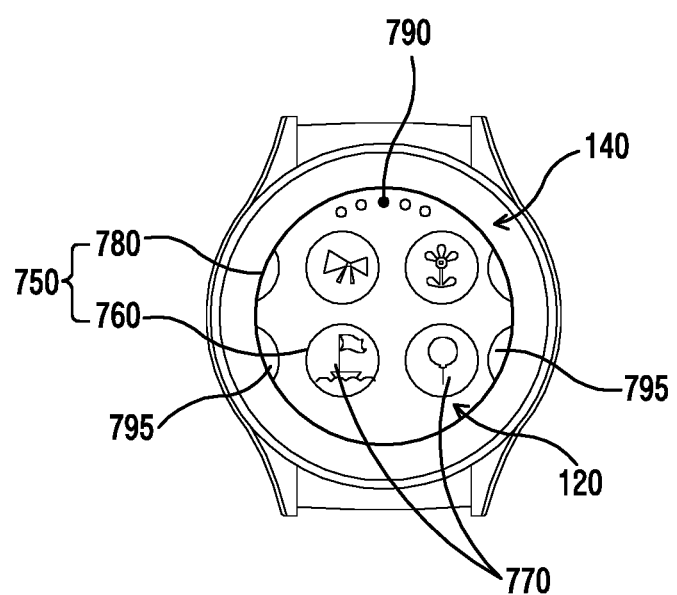

For example, while displaying at least two of the items 770 in the second sub-view 750, as illustrated in FIG. 19, in response to the rotation input, the controller 180 may display at least two other items 770 in the second sub-view 750, as illustrated in FIG. 20. The controller 180 may continually display the indicator 790 in the second sub-view 750, and may additionally display a cue 795 in the second sub-view 750.

Referring again to FIG. 15, after the stoppage of the rotation input is detected in step 923 or 929, the controller 180 determines whether a critical time has elapsed without receiving any additional input in step 937. Namely, when no input data is generated from the input unit 130 or the rotary unit 140 over the critical time, the controller 180 determines that the critical time has elapsed. The critical time may be set in advance in the storage unit 170.

When the controller 180 determines that the critical time has elapsed in step 937, the controller 180 forms a main view in step 939, and displays a first object in the main view in step 941. For example, as illustrated in FIG. 16, the controller 180 displays the first object 620 in the first display area 610 of the main view 600. Accordingly, the controller 180 may process data for the first object 620. Here, the data for the first object 620 may be the same as that for the second object 720.

When the controller 180 determines that the critical time has elapsed while one of the items 720 is being displayed in the first sub-view 700, as illustrated in FIG. 17. the controller 180 may display the corresponding item in the main view 600, as illustrated in FIG. 16. For example, the controller 180 may decode data for the corresponding item to correspond to the first display area 610 of the main view 600.

Alternatively, when the controller 180 determines that the critical time has elapsed while at least two other times are being displayed in the second sub-view 750, as illustrated in FIG. 19, the controller 180 may display one of the corresponding items in the main view 600, as illustrated in FIG. 16. Here, the controller 180 may select and display one of the corresponding items, which is situated at a preset location. For example, the controller 180 may decode data for one of the corresponding items to correspond to the first display area 610 of the main view 600. The controller 180 may additionally display the indicator 640 in the first display area 610 of the main view 600.

When the controller 180 determines that the critical time has not elapsed, the controller 180 determines is a second object is detected in step 943.

For example, when touches are generated to correspond to the second display areas 710 and 760, as illustrated in FIGS. 18 and 19, respectively, the controller 180 may detect the selection of the second objects 720 and 770, respectively. Alternatively, when a pressure input data is generated by the rotary unit 140, the controller 180 may detect the selection of the second objects 720 and 770 in response thereto.

Referring again to FIG. 15, the controller 180 forms a content view in step 945. The controller 180 may form the content view to correspond to the display unit 120. Accordingly, the shape and the size of the content view may be the same as those of the display unit 120.

In addition, the controller 180 displays content in the content view in step 947.

For example, while one of the items 720 is being displayed in the first sub-view 700, as illustrated in FIG. 18, when the corresponding item 720 is selected, the controller 180 may display the content 820 in the content view 800. Namely, the controller 180 may display the content 820, as illustrated in screen (a) of FIG. 21. Here, the controller 180 may decode data for the corresponding item.

Figure 21:
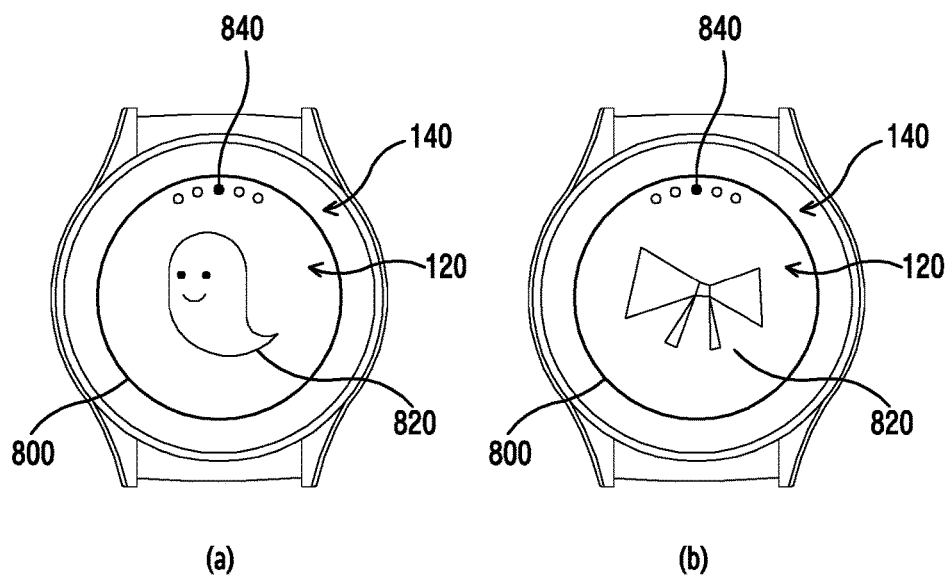
FIG. 21 illustrates different examples of displaying content in a content view according to an embodiment of the present disclosure.

As another example, while at least two other items 770 are being displayed in the second sub-view 750, as illustrated in FIG. 20, when one of the corresponding items 770 is selected, the controller 180 may display the content 820 in the content view 800, as illustrated in screen (b) of FIG. 21. The controller 180 may additionally display an indicator 840 in the content view 800.

According to various embodiments of the present disclosure, an electronic device displays an object through the various views 600, 700, and 750. The electronic device may perform switching between the views 600, 700, and 750 in response to a rotation input. As a result, a user of the electronic device can easily identify a correlation between the data.

For example, although the display unit 120 is implemented in a small size in the electronic device, the user of the electronic device can easily identify a correlation between the data. Accordingly, the use efficiency and user convenience of the electronic device can be enhanced.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A display method of an electronic device, comprising:
displaying, by the electronic device, at least one first content among multiple contents in a shape of a circle having a radius of a circular display of the electronic device;
receiving, while displaying the first content, a user input that occurs through a user rotating a rotary unit, wherein the rotary unit is rotatably coupled to the electronic device in a circular shape surrounding the circular display;
displaying, in response to receiving the user input with a rotation angle smaller than a preset angle, at least two of the multiple contents, respectively, in at least two first portions, wherein each of the at least two first portions is in a shape of a circle with a first radius smaller than the radius of the circular display, according to a first magnification, wherein positions of the at least two first portions are shifted along a designated first axis according to an adjustment of the rotation angle, and wherein a distance between the at least two first portions is maintained while the rotation angle does not exceed the preset angle;
displaying, in response to identifying that the rotation angle of the user input exceeds the preset angle, at least two of the multiple contents, respectively, in at least two second portions, wherein each of the at least two second portions is in a shape of a circle with a second radius smaller than the first radius, according to a second magnification distinct from the first magnification, wherein positions of the at least two second portions are shifted along two designated second axes according to an adjustment of the rotation angle while maintaining a radius of the at least two second portions as the second radius.

2. The display method of claim 1, wherein the radius of the at least two first portions is maintained as the first radius while the rotation angle does not exceed the preset angle.

3. The display method of claim 1, wherein the designated first axis corresponds to a diameter of the circular display.

4. The display method of claim 3, further comprising:
displaying a visual element indicating an order of the displayed at least two of the multiple contents among the multiple contents aligned in the diameter of the circular display.

5. The display method of claim 1, wherein the two designated second axes are parallel to each other in the circular display.

6. The display method of claim 5, further comprising:
displaying a visual element indicating an order of the displayed at least three of multiple contents among the multiple contents aligned in the two designated second axes.

7. The display method of claim 1, further comprising:
identifying a second user input on the circular display in a preset time interval initiated after termination of the user input; and
displaying in response to the identifying of the second user input, a second content regarding the second user input in an entire area of the circular display.

8. The display method of claim 7, further comprising:
identifying, in response to expiration of the time interval without identifying the second user input, a third content corresponding to a preset area of the display among the multiple contents; and
displaying, in response to identifying the third content, the third content in the entire area of the display.

9. The display method of claim 7, further comprising:
re-displaying, in response to expiration of the time interval without the identifying of the second user input, the first content in the entire area of the display.

10. An electronic device comprising:
a housing;
a circular display disposed on the housing;
a rotary unit rotatably coupled to the housing in a circular shape surrounding the circular display; and
a processor configured to:
display at least one first content among multiple contents in a shape of a circle having a radius of the circular display;
receive, while displaying the first content, a user input that occurs by a user rotating the rotary unit;
display, in response to receiving the user input with a rotation angle smaller than a preset angle, at least two of the multiple contents, respectively, in at least two first portions, wherein each of the at least two first portions is in a shape of a circle with a first radius smaller than the radius of the circular display, according to a first magnification, wherein positions of the at least two of the first portions are shifted along a designated first axis according to an adjustment of the rotation angle, and wherein a distance between the at least two first portions is maintained while the rotation angle does not exceed the preset angle;
display, in response to identifying that the rotation angle of the user input exceeds the preset angle, at least two of the multiple contents respectively, in at least two second portions, wherein each of the at least two second portions is in a shape of a circle with a second radius smaller than the first radius according to a second magnification distinct from the first magnification, wherein positions of the at least two second portions are shifted along two designated second axes according to adjustment of the rotation angle while maintaining a radius of the at least two second portions as the second radius.

11. The electronic device of claim 10, wherein the radius of the at least two first portions is maintained as the first radius while the rotation angle does not exceed the preset angle.

12. The electronic device of claim 10, wherein the processor is further configured to:
display, in response to receiving the user input with the rotation angle smaller than the preset angle, at least two of the multiple contents being aligned according to the designated first axis corresponding to a diameter of the circular display.

13. The electronic device of claim 10, wherein the two designated second axes are parallel to each other in the circular display.

14. The electronic device of claim 10, wherein the processor is further configured to:
identify a second user input on the circular display in a preset time interval being initiated after termination of the user input; and display, in response to identifying the second user input, a second content regarding the second user input in an entire area of the circular display.

15. The electronic device of claim 14, wherein the processor is further configured to:
identify, in response to expiration of the time interval without the identifying of the second user input, a third content corresponding to a preset area of the display among the multiple contents; and
display, in response to the identifying the third content, the third content in the entire area of the circular display.

16. The electronic device of claim 12, wherein the processor is further configured to display a visual element indicating order of the displayed at least two of the multiple contents among the multiple contents aligned in the designated first axis.

\* \* \* \* \*